United States Patent
Akhter et al.

(10) Patent No.: US 10,250,474 B2
(45) Date of Patent: Apr. 2, 2019

(54) CALCULATING LATENCY IN COMPUTER NETWORKS

(71) Applicant: Cisco Technology, Inc., San Jose, CA (US)

(72) Inventors: Aamer Akhter, Cary, NC (US); Plamen Nedeltchev, San Jose, CA (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 479 days.

(21) Appl. No.: 14/230,224

(22) Filed: Mar. 31, 2014

(65) Prior Publication Data
US 2015/0281028 A1  Oct. 1, 2015

(51) Int. Cl.
*H04L 12/26* (2006.01)

(52) U.S. Cl.
CPC ........ *H04L 43/0858* (2013.01); *H04L 43/106* (2013.01)

(58) Field of Classification Search
CPC .................... H04L 43/0858; H04L 43/106
See application file for complete search history.

(56) References Cited

U.S. PATENT DOCUMENTS

| | | | |
|---|---|---|---|
| 6,873,600 B1 | 3/2005 | Duffield et al. | |
| 7,088,677 B1* | 8/2006 | Burst, Jr. | H04L 47/10 370/229 |
| 7,496,044 B1 | 2/2009 | Wing | |
| 7,519,006 B1* | 4/2009 | Wing | H04L 29/06027 370/252 |
| 7,729,267 B2 | 6/2010 | Oran et al. | |
| 8,547,855 B1* | 10/2013 | Zingale | H04L 41/142 370/241 |
| 2002/0087861 A1* | 7/2002 | Segev | H04L 63/08 713/168 |
| 2003/0016627 A1* | 1/2003 | MeLampy | H04L 29/06027 370/235 |
| 2003/0026268 A1* | 2/2003 | Navas | H04L 29/12009 370/400 |
| 2004/0267703 A1* | 12/2004 | McEnery | G06F 19/322 |
| 2005/0169188 A1* | 8/2005 | Cometto | H04L 47/10 370/249 |
| 2007/0268850 A1* | 11/2007 | Hansson | H04J 3/0667 370/315 |
| 2007/0274227 A1* | 11/2007 | Rauscher | H04L 12/2697 370/252 |

(Continued)

OTHER PUBLICATIONS

Krishna P. Gummadi, Stefan Saroiu, and Steven D. Gfibble, King: Estimating Latency between Arbitrary Internet End Hosts SIGCOMM Internet Measurement Workshop 2002.*

(Continued)

*Primary Examiner* — Noel R Beharry
*Assistant Examiner* — Wilfred Thomas

(57) ABSTRACT

In one implementation, data is communicated along a communications route in a network. A mediatrace request is generated for the communications route. Responses to the mediatrace request are received from along the communications route. The hop-by-hop latency is passively measured, from the responses, with one-way delay along the communications route in the network.

20 Claims, 4 Drawing Sheets

(56) References Cited

U.S. PATENT DOCUMENTS

| | | | | |
|---|---|---|---|---|
| 2008/0025320 | A1* | 1/2008 | Bangalore | H04L 65/1069 370/395.52 |
| 2009/0003334 | A1* | 1/2009 | Vadlakonda | H04L 41/14 370/389 |
| 2009/0304046 | A1* | 12/2009 | Nadler | H04B 7/155 375/141 |
| 2010/0118722 | A1* | 5/2010 | Lu | H04J 3/24 370/252 |
| 2011/0063988 | A1* | 3/2011 | Lee | H04L 41/5009 370/252 |
| 2011/0069626 | A1* | 3/2011 | Sun | H04L 12/2697 370/252 |
| 2011/0170426 | A1* | 7/2011 | Kompella | H04L 45/22 370/242 |
| 2012/0008498 | A1* | 1/2012 | Clemm | H04L 41/0213 370/235 |
| 2012/0054266 | A1* | 3/2012 | Kazerani | H04L 41/5067 709/203 |
| 2013/0322258 | A1* | 12/2013 | Nedeltchev | H04L 43/04 370/241 |
| 2013/0326049 | A1* | 12/2013 | Talton | H04L 43/04 709/224 |
| 2013/0347103 | A1* | 12/2013 | Veteikis | H04L 43/04 726/22 |
| 2014/0304393 | A1* | 10/2014 | Annamalaisami | H04L 43/04 709/224 |

OTHER PUBLICATIONS

Akhter, Mediatrace: A Better Traceroute that Doea the Walking for you, Cisco Blog, Mar. 17, 2011.
Almes et al., A One-Way Delay Metric for IPPM, Sep. 1999, The Internet Society.
Almes et al., A Round-Trip Delay Metric for IPPM, Sep. 1999, The Internet Scoiety.
Duffield et al., Trajectory Sampling for Direct Traffic Observation, 2001, Networking IEEE/ACM Transactions on 9.3.
Precision Time Protocol, last updated Mar. 18, 2014, Wikipedia.
U.S. Appl. No. 13/652,585, filed Oct. 16, 2012.
U.S. Appl. No. 14/016,463, filed Sep. 3, 2013.
Zhang et al., Resource ReSerVation Protocol (RSVP)—Version 1 Functional Specification, Sep. 1997.
Zseby et al., Sampling and Filtering Techniques for IP Packet Selection, Mar. 2009, IEFT Trust.

* cited by examiner

CALCULATING LATENCY IN COMPUTER NETWORKS

TECHNICAL FIELD

This disclosure relates in general to computer networks, and more particularly to calculating latency calculation in computer networks.

BACKGROUND

A computer network path may be formed from multiple layer 2 (L2) and layer 3 (L3) hops. Each leg or hop and corresponding node may contribute to latency and jitter. There have been various methods (e.g., Internet Control Message Protocol (ICMP) pings or Internet Protocol Service Level Agreement (IPSLA) probes) to measure path latency and/or nodal latency. For these methods, synthetic traffic is used. Rather than using the user data (e.g., audio or video), requests or packets generated for management or to measure latency are used. For example, utilities, such as traceroute and path ping, are available for displaying a route of a packet across a network. Successive protocol packets are sent across the network with varying hop limits. Return messages produce a list of routers that the packets have traversed. Timestamps included in the return messages may describe delays of the management packets. This information provides operators data for each hop along a path to the destination. Rather than measuring using synthetic traffic, the Medianet One Way Delay (OWD) project provides time measurements on user traffic using packet identifiers, timestamps, NetFlow export, and a NetFlow collector.

BRIEF DESCRIPTION OF THE DRAWINGS

Exemplary embodiments of the present disclosure are described herein with reference to the following drawings.

DESCRIPTION OF EXAMPLE EMBODIMENTS

Overview

Figure 1:
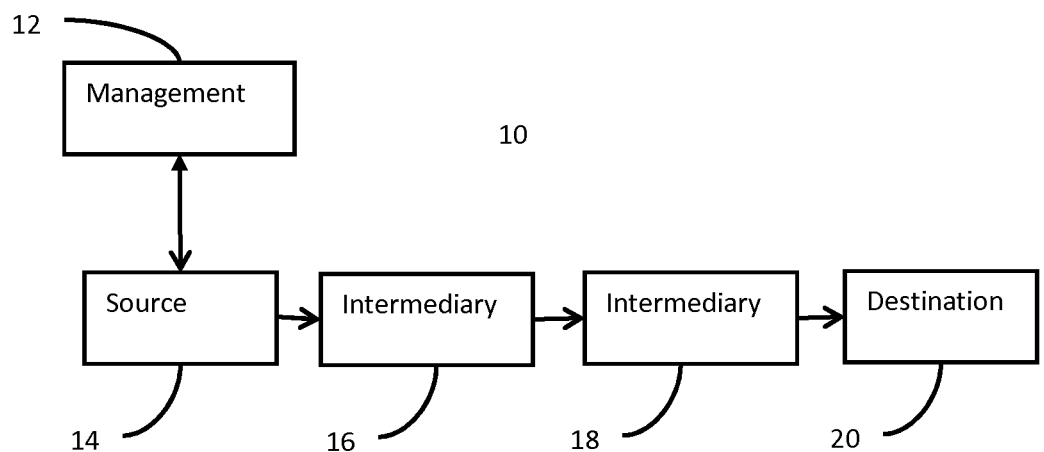
FIG. 1 illustrates an example flow path of user traffic in a computer network.

In one embodiment, data from a source device is communicated to a destination device along a flow path. A request is transmitted from the source device to an intermediary device of the flow path. The request includes an identification of packets of the data and a timestamp query. The source device receives, from the intermediary device and in response to the request, timestamps for the identified packets of the data received by the intermediary device from the source device. The source device calculates a latency of the identified packets of the data on the flow path from the source device to the intermediary device using the timestamps.

In another embodiment, a communication interface is configured to transmit path discovery requests for one-way delay for nodes along a flow path of data. A controller is configured to gather timestamps from the nodes along the flow path and calculate latency from the timestamps.

In yet another embodiment, data is communicated along a communications route in a network. A mediatrace request is generated for the communications route. Responses to the mediatrace request are received from along the communications route. The hop-by-hop latency is passively measured, from the responses, with one-way delay along the communications route in the network.

Example Embodiments

Some measures of latency use synthetic traffic (i.e., response to protocol packets used for management instead of the native (user-generated) traffic). With the usage of quality of service (QoS), and advanced traffic selection technologies, such as medianet metadata or deep packet inspection/network based application recognition (DPI/NBAR), the difference in network treatment of synthetic traffic (i.e., fake traffic) and actual or user traffic is getting wider and wider. In addition, injecting traffic into the network for the purposes of measuring the performance parameters of the network often proves to be performance impacting and may defeat the purpose of the measurements.

OWD may require a pre-determined traffic selector and monitoring infrastructure. NetFlow exports to the NetFlow collector, but the out-of-flow NetFlow collector must understand network topology. This arrangement may be resource intensive and pre-planning is needed. This type of deployment overhead may prevent implementation for many situations requiring troubleshooting and network investigation.

In a different approach to determine latency along a flow path from actual traffic flow, mediatrace is used to request timestamp information for user traffic from nodes along the flow path. The user traffic source or other initiator of the mediatrace request implements the one-way-delay (OWD) calculations.

Certain embodiments of this disclosure relate to measuring latency with one-way-delay of user traffic. The timestamp information is communicated to a device in the traffic path using communications for dynamic pathing, such as mediatrace.

More dynamic traffic selection and correlation of timing may be provided using extensions to the existing mediatrace protocol. In certain embodiments, this OWD-Mediatrace combination calculates latency on user traffic, but may be more flexible and lightweight than a NetFlow/static-configuration model. Using dynamic pathing communications may provide flexibility and reduce or eliminate overhead management of a static model. In certain embodiments, leveraging mediatrace or other dynamic pathing communications may reduce or eliminate pre-planning and deployment of specialized pieces.

In the original medianet OWD project, a static configuration is used to select the traffic classes to monitor. A hash is used to select the same packets at each observation node (O-NODE). The user traffic is not modified. A signature of these packets is attached with the received timestamp and sent via NetFlow to a NetFlow collector. The NetFlow collector receives the timestamps from the various nodes encountered from the packet encountered. Using these timestamps, NetFlow analysis code is used to determine latency between any two nodes as well as end-to-end latency or round trip travel time (RTT).

The static approach may be modified. An OWD approach for passively measuring latency is combined with a modification of the functionality of the mediatrace protocol to allow source-to-destination (S-D) and destination-to-source (D-S) one way delay and RTT calculations to be reported as part of the mediatrace reporting based on trajectory sampling. Rather than using a static configuration in the original OWD work, the dynamic traffic filter criteria (i.e., the flow to monitor) is received via the mediatrace request. The O-NODE behavior is modified to replace exporting using NetFlow to an off-flow collector with exporting to the mediatrace initiator, such as the source or device in the user traffic flow. The behavior of the mediatrace initiator is modified to calculate and report per hop performance monitoring data in mediatrace reporting and/or export the correlated latency data using NetFlow in the mediatrace reporting. A separate off-flow collector is not needed. The mediatrace requestor is capable of calculating the latency and/or RTT between any arbitrary number of hops along the path of the mediatrace streams from the source to the destination and destination to the source.

Since latency and RTT may be calculated using OWD as modified with mediatrace communications, all five major QoS parameters (i.e., throughput, packet loss, jitter, latency, and RTT) relevant to actual voice and video traffic may be reported on a per hop-by-hop basis between any two hubs of the media path in the network. In contrast to traceroute and to ICMP-based methods, latency and RTT for a given flow in a given path is measured deterministically and proactively. Two mechanisms (OWD and mediatrace) are combined to report one or more foundational IP SLA parameters, such as latency and RTT. RFC 2679 and RFC 2681 performance metrics may be reported. Medianet thresholds and alerts may be based on jitter and drop values, as well as latency values. When any threshold is exceeded, the network management platform (CPCM, CPAM) may generate a mediatrace from one random hop to another to the mediatrace path. The same threshold violation can be seen on the CLI screen. Both latencies and BW may be included in the mediatrace output.

In some analytical models, the RTT is used to calculate capacity, bottleneck bandwidth, or available bandwidth as a dynamic measure of the load on a path, or more precisely, the residual capacity of a path. In some models, the RTT is used for load assessment to evaluate the queuing delays on the hop. By providing granularity at the per-flow level and with end-to-end path-awareness for latency and RTT measurement, the modeling may be improved.

FIG. 1 illustrates an example traffic flow in a network 10. The network 10 is within one domain or enterprise, but may be formed from multiple networks of different domains or enterprises. The traffic flow is a dedicated flow of packets between the source and the destination. In certain embodiments, the traffic flow is uni-directional. The traffic flow may include any suitable combination of media, such as audio and/or video data. For example, the traffic flow may be a voice over internet protocol (VoIP) call, a video transmission between the end user devices, or any type of flow. Other data may include, for example, fax-over-IP, shared virtual whiteboard, video from a telepresence meeting, audio from a telepresence meeting, telemetry information around http and https traffic, and/or other delay sensitive real-time communication. The traffic flow is user data or data being provided to a user of the network 10. Management data, or non-user data, for monitoring or controlling operation of the network 10 uses the same or different connections, devices, and/or path.

The traffic flow is a multi-hop flow from source device 14, through two intermediary devices 16, 18, and to the destination 20. A media stream flows from the source device 14 to the destination device 20, passing through the intermediary devices 16, 18. Any arbitrary traffic flow path may be used, including any number of intermediary devices or nodes. Additional, fewer, or different nodes may be included in the network 10.

The source 14, intermediary 16, 18, and/or destination 20 devices are servers, routers, firewalls, switches, proxy machines, or other computer network components. The devices include wireless or wired connection to the network 10. The connection provides a data link or a tunnel for the traffic flow. Example circuits for connection use virtual circuits, frame relay, Ethernet, virtual local area networks, generic route encapsulation (GRE) tunnels, layer 2 tunneling protocol, multiprotocol label switching (MPLS), or other connections. The packets of the traffic flow travel through the network using one or more types of connections.

The connections and corresponding nodes used by a given traffic flow may be arbitrary or dynamic. The flow path is established for or during serving of the user traffic from the source 14. The source 14 for the network 10 is the originator of the user traffic, but may itself be an intermediary device (e.g., edge router) that is a local source. Similarly, the destination is a final destination or a local destination (e.g., intermediary device of the total communications route).

The source device 14 includes a media trace utility. The media trace utility tracks the media flow between the source device 14 and the destination device 20 and gathers performance statistics for hops along the media flow. In one embodiment, the source device 14 is a media trace server configured to perform a discovery process, a performance statistic collection process, and a reporting process.

A media trace signaling message may be established in parallel with media flow using a protocol, such resource reservation protocol (RSVP) as published in RFC 2205 in 1997. The signaling message is established in parallel based on the 5/6 tuple information of the traffic flow. The signaling messages are routed thru each node along the media path necessary to collect quality of service, session flow, and system performance metrics.

In the discovery process, the source device 14 may discover or become aware of the existence of the routers or other nodes making up the traffic flow path. The routers may include the intermediary devices 16, 18. The routers may generate and send router advertisements that announce the existence of the routers. The router advertisements may be sent periodically (e.g., 5 seconds, 1 minute, 10 minutes, or another time period). The router advertisements may be sent to every interface of the routers, and accordingly, reach every other device within and coupled to the network.

Alternatively, the source device 14 may generate a router solicitation and send the router solicitation to the routers. The routers respond with router advertisements. Router advertisements are data packets that include an IP address and an advertisement lifetime value. The advertisement lifetime value sets a time period that the IP address is valid. The router is configured to send another router advertisement before the time period expires.

Through the discovery process, the media trace server becomes aware of the routers on the traffic flow path. The media trace server may store the addresses of the routers in a database or memory as a network map, a router table, or other collection.

In the performance statistics collection process, the media trace server accesses the network map for IP addresses to send a message to each of the routers on the traffic flow path requesting performance statistics. The performance statistics may include a packet drop count, a data flow count, a packet count, a packet drop reason, a data rate, a jitter rate, a packet loss percentage, a confidence level, packet delay value, or other statistics from each of the routers or other devices along the traffic flow path. Additional, different, or fewer performance statistics may be used.

In one embodiment, the media trace server is configured to request and collect timestamp information. The timestamp information from the routers or other devices (e.g., intermediary devices 16, 18, and destination device 20) may be used to calculate the one-way-delay (OWD) and/or RTT as another performance statistic or metric.

The media trace server is configured to collect the performance statistics and compile the performance statistics into a media path table, which is stored in memory. The media path table may be arranged according to media flows (e.g., where the source 14 or network 10 associated with multiple different user traffic flows) or according to administrative network domains networks. Alternatively, separate media path tables may be generated for separate media flows for logically different administrative network domains.

In alternative embodiments, other pathing than mediatrace is used. Any communications for determining a flow path and/or statistics about the flow along a dynamic or arbitrary path may be used.

Figure 2:
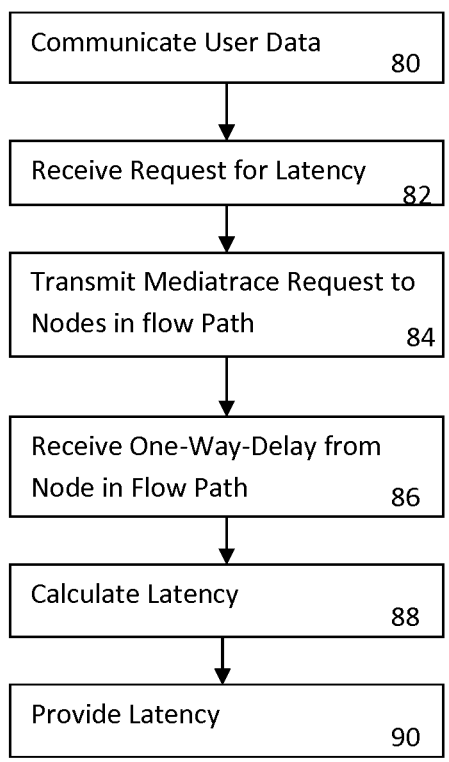
FIG. 2 illustrates an example flow chart diagram of a method for determining latency for a flow path.

FIG. 2 shows one embodiment of a flow chart of a method for determining the latency and/or RTT for the user traffic using OWD in conjunction with mediatrace or other pathing communications. The acts of the flowchart may be performed in the order shown or a different order. For example, the request to provide latency information may occur before the communication of the user data over the flow path. Additional, different, or fewer acts may be provided. For example, acts 82 and/or 90 are not performed. As another example, acts associated with gathering other statistics and/or tracing the traffic flow may be provided.

The acts of the flowchart are performed by the media trace server, such as the source 14. The destination 20 may be a source for return flow or traffic flow in an opposite direction. The destination 20 may perform the acts. The flowchart reflects acts performed by the initiator or data collector along the flow path. Other acts are performed by other nodes, such as acts for timestamping and/or responding to requests. Other devices or nodes may perform one or more of the acts, such as a server or computer device performing the calculation of act 88 outside of or not along the traffic flow path. The initiator collects the timestamps, but another device (e.g., a management workstation, customer server, or user device) performs the calculation.

In act 80, user data is communicated from a source device to a destination device. The source may be an absolute source of the data, such as an end-point of the flow of traffic, and the destination may be an absolute destination of the data, such as an end-point of the flow of traffic. Alternatively, the source and/or destination are relative, such as being nodes along a larger path. For example, the source and destination are edge routers of a network communicating the user data from and to other networks or devices. As another example, the source is merely an intermediary node within an overall path. The source is the source of user traffic that is going to be tracked or for which statistics are gathered. The source initiates the pathing (e.g., mediatrace) and statistic gathering.

A protocol appropriate for the type of communication, such as VoIP, is used to establish the flow path for communicating user data. A tunnel or other routing may be used for communicating user traffic along the route.

The user traffic includes packets, generated by the user. Different types of packets may be provided, such as packets for audio, packets for video, and/or packets for other content. Any type of media may be communicated. In other embodiments, data other than or in addition to media data is communicated, such as real-time stream data (e.g., audio and/or video applications) or http and https based telemetry data.

In act 82, the source receives an instruction to initiate collection of statistics, such as latency. The performance statistics collection process may be performed periodically (e.g., every 1, 5, or 10 minutes) or in response to a request. For example, the media trace server may receive a request to troubleshoot a media stream, such as the user traffic along the traffic flow path of FIG. 1. The media trace server satisfies the request by forwarding the media path table, including performance data of at least network device (e.g., intermediary device 16, 18, and/or destination device 20) for the given media stream.

A requestor device (e.g., management device 12 of FIG. 1) sends the instruction, such as sending a request for statistics. The requestor device may be a management workstation, such as where a network administrator wishes to gather data for the network. The requestor device may be a customer workstation, such as a customer of a network provider sending the request in order to measure QoS for IP SLA. In another embodiment, the requestor device is a user device, such as a personal computer or cellular phone of an individual where the statistics of the traffic flow path are to be provided to the user. The request may originate with a customer who has experienced dropped packets or a lack of connectivity.

The source receives a request to troubleshoot or gather statistics for a traffic flow (e.g., media stream). The request may include the IP address of the requestor as well as a security credential to verify that the requestor is authorized to receive performance statistics from the provider network. The request to measure the traffic flow may be in the form of an RSVP message, but other formats may be used.

In an alternative embodiment, a request is not provided. The source performs the statistic gathering in response to an elapsed time period. The time period may be predetermined or set by the user. Other triggers than a request may be used.

In act 84, the source, acting as an initiator, transmits a request or requests to one or more nodes of the traffic flow path. For example, the source transmits a request for timestamp information. The request is formatted in any manner. The request is sent over the same or different communications links as the user traffic, such as sending the request over a separate management network.

The request is addressed to the destination device. The destination for the request may be the absolute destination or an intermediary device. Separate requests may be transmitted for separate devices along the traffic flow path. Alternatively, the initiator sends a request to the final destination, whether absolute destination or not, and any intermediary node through which the request passes also responds to the request. For example, the initiator sends the request towards the absolute destination for determining the route or path of the user traffic flow through various intermediary devices.

Since the latency is to be determined passively or from actual user traffic, the user traffic is identified. The request includes an identification of the packets. The identification may be of the particular user traffic, of the type of packets (e.g., video), and/or of specific packets within the traffic flow. The transmitted identification may identify multiple packets, such as all of a same type in a given traffic flow or all or some of different types of packets. In one embodiment, latency is to be gathered for different types of packets in the traffic flow, such as latency for video verses latency for audio. The identity may include a 5/6 tuple for the traffic to be monitored.

The request also includes a timestamp query. The timestamp query may be a flag. Alternatively, the time stamp query is the request itself. The timestamp query requests one-way-delay information for the identified packets of data. The one-way-delay information may be a timestamp for receipt of the identified packets or may be for a calculated delay. The timestamp request is for a time of receipt, but a request for a difference in time from transmission to receipt where the transmission time is provided with the packet may be provided.

Each node is requested to send back absolute timestamps. To compare times between nodes or devices, the devices are synchronized. Any synchronization may be used, such as NTP/PTP/IEEE1588 based synchronization. There may be initial periods of time where the clocks between the measurement nodes are not completely synchronized to the master clock. A confidence in the synchronization may be provided with the timestamp. Any measure of confidence based on the synchronization may be used, such as the deviation determined in the iterative synchronization process. The confidence may reflect accuracy and/or precision of the measurement node.

In one embodiment, the request is transmitted as a route discovery request for the flow path. The source initiates a route discovery process on the network. The route discovery process may be performed directly by the source through sending and receiving discovery messages. Alternatively, the source may send a command to a network management system to perform the route discovery process or return data based on a previous route discovery process. The network management system may generate a media trace table that lists the network devices and traffic flows in the network.

The media trace query may be in the format of resource reservation protocol (RSVP). The media trace query follows the same path as the media packets because the media trace query is routed in the same manner as the media packets according to the routing table constructed by a routing protocol. As a consequence, the media trace query is in a single direction. In other words, the media flow and the media trace are simplex flows in one direction. For example, a different media trace query is used to gather statistics regarding a media flow from source device 14 to destination 20 of FIG. 1 than the media trace query used to gather statistics from a media flow from destination device 20 to source device 14.

Another application for the media flow and media trace query may be real time transport protocol (RTP). Because the header of the media trace query includes a label that is also included in the media packets, both the media trace query and the packets carrying media payloads follow the same media path.

The route discovery process allows the source to build a map of the topology of the network, at least for the user traffic flow. The route discovery process may use a combination of techniques on either the data link layer (layer 2) or network layer (layer 3). The layer 3 protocols include open shortest path first (OSPF) routing protocol as defined by RFC 2328 published in 1998 and RFC 5340 publish in 2008, intermediate system to intermediate system (ISIS) routing protocol as defined by RFC 1142 and published in 1990, or border gateway protocol (BGP) as defined by RFC 4271 and published in 2006. The layer 2 protocols include Cisco discovery protocol (CDP), link layer discovery protocol (LLDP), multiprotocol label switching (MPLS), operation-administration-maintenance (OAM) tools, or Ethernet OAM tools. The route discovery process may include a software utility that involves successive packets sent across the provider network with varying hop limits. The route discovery process determines the traffic flow path or paths through the provider network including compatible and incompatible network devices.

The request is a mediatrace request, such as a MT-RQ. The MT-RQ is sent from the initiator and includes a request to monitor a specific flow with the one-way-delay profile. The profile defines the format for requesting timestamp information for the identified packets. The traffic flow path may be dynamically established, such as where the route is determined as needed or when the user requests. Using the path tracing request, such as mediatrace, allows requesting of the timestamps for hops along the dynamic path.

In one embodiment, the mediatrace request is a 32 bit or other number of bit request that includes a filter specification identifying the packets, a sampling parameter (e.g., divisor and remainder) indicating a number of packets matching the filter specification for which timestamps are to be collected, a monitor interval defining the period during which the node is to monitor for packets, and a start time defining the beginning of the period. Other content and/or formats may be used.

Other information may be included in the request. For example, the request or a separate request includes instructions for a reverse measure. The transmitted request is a for timestamping or latency information from the source to the destination. For example, a mediatrace request is sent to obtain one-way-delay timestamps for user flow traffic proceeding from the source to the destination. The mediatrace request also indicates that the destination should act as a source and initiate a mediatrace request from the destination to the source for user traffic occurring in the reverse direction along the same or a different route. Latency information, such as timestamps, may be requested along both directions.

The intermediary nodes and/or destination receiving the request operate as observation nodes of a one-way-delay mechanism. Rather than using NetFlow, the observation nodes respond with the timestamps as responders to the request from the initiator, such as mediatrace responders. The observation nodes are along or in the user traffic flow path.

The observation nodes, such as intermediary devices of the user traffic flow path, record the arrival times and packet signatures of the target user flows. Using the filter specification, the packets of interest are identified. The sampling parameters may further narrow which packets to use. During the monitoring period, the time of arrival of the identified packets is stored, such as in a buffer, with a signature (e.g., hash) of the packet.

Figure 3:
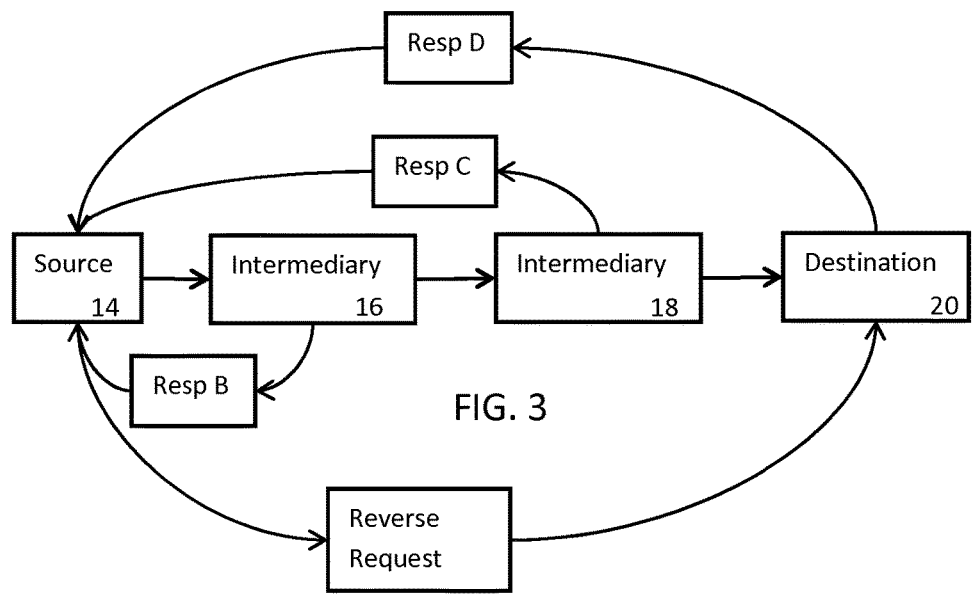
FIG. 3 illustrates example requests and responses for determining latency using OWD with pathing communications.

After accumulating sufficient or pre-determined number of timestamped packet signatures, after a pre-determined number of packets, and/or after a pre-determined period, a response to the request is sent to the initiator. For example, FIG. 3 shows the intermediary 16 sending a response (resp B) to the source 14.

The response has any format. For example, the response is a mediatrace response, MT-RS. Each of the observation nodes (e.g., intermediaries 16, 18 and destination 20) send an MT-RS response to the initiator or source 14. The observation nodes are also mediatrace responders in this example. MT-RS is sent to the initiator from the responder with the specific flow and mediatrace ID echoed from the request. The MT-RS may include other information, such as the accuracy and precision of the clock synchronization on the observation-node and 5/6 tuples representing the individual packets and attached timestamps encountered. One example summary of MT-RS is:
[flow spec]
[mediatrace request ID]
[O-node clock precision]
[o-node clock accuracy]
[[timestamp1][packet signature1]]
[[timestamp2][packet signature2]]
The timestamp and packet signature for one or more packets are included. For example, the collection of timestamps and signatures for different packets of the same or different types are included. Other information, such as a copy of the packet itself, may be used instead or with the information in the example above.

The observation-node attaches the arrival time to the packet or the signature representing the packet. The observation node, performing as the mediatrace responder on the flow path, provides the timestamps to the initiator, also on the flow path.

In act 86, timestamps are received. The initiator receives the timestamps from the intermediary and/or destination devices in response to the request. The timestamps are for the identified packets received by the intermediary and/or destination devices from the source device.

In one embodiment, the initiator (e.g., source 14) performs the performance statistics collection process according to the map of the network and/or user traffic flow path. The initiator is configured to send a performance inquiry message to each network device included in the traffic flow and/or network map. In response to the query messages, the observation devices send information for system performance statistics in the respective inquiry format back to the initiator.

The initiator of the trace collects performance data, including the timestamp or other latency information. A user may specify an interval for the collection of performance data. The interval may be specified by a subscription level. Alternatively, the network management system may collect and forward the performance data in response to a command from the initiator, which is sent in response to the request to troubleshoot or measure the traffic flow.

The timestamps received by the initiator may include timestamps for different types of packets. For example, for receipt of packets by a given node, one or more timestamps are for audio and one or more timestamps are for video or other data. Timestamps for both or multiple types of packets are received in response to the mediatrace or other request. The timestamps are received from a node along the communications route. Timestamps for one of the hops along the communications route are obtained by the initiator from the observation node implemented on the device terminating a given hop.

Timestamps may be received for any number of hops. Timestamps are received from more than one node of the communications route. The same packets or type of packets are identified and timestamped by multiple nodes (e.g., intermediary and/or destination devices). Due to the sampling criteria, different actual packets may be identified. Alternatively, the same packets are identified by each node. The request propagates along the communications route so that timestamps are received by the initiator from the different nodes.

In the example of FIG. 3, the initiator receives the responses from the different nodes. The responses are provided directly or indirectly. The same communications route used by the user traffic flow and request or a different route is used to communicate the responses. In one embodiment, the responses are relayed by the intermediary nodes. For example, response D from the destination 20 is forwarded to the intermediary node 18, which forwards the response D to the intermediary node 16, which forwards the response D to the source 14. Similarly, the response C from intermediary 18 is forwarded to intermediary 16, which forwards the response C to the source 14. Intermediary 16 directly communicates response B to the source 14. Any format may be used, such as including a request identifier (RQDI), inter-agent management protocol parameter (IAMP param), and IAMP application request.

Figure 4:
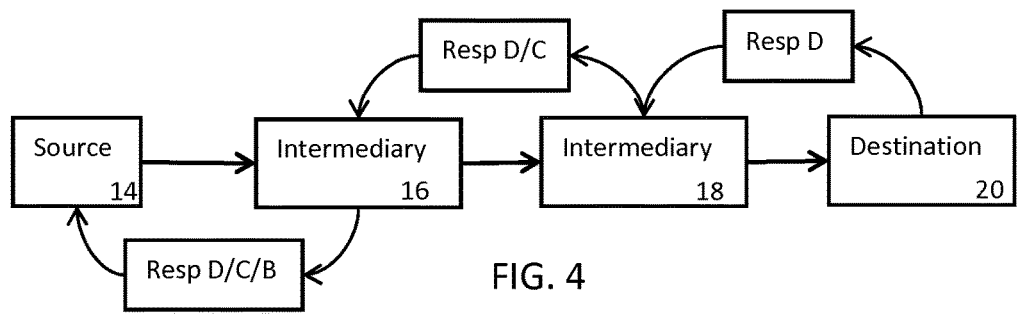
FIG. 4 illustrates an alternative example with concatenated responses for determining latency.

In one embodiment, the responses may be concatenated. FIG. 4 shows an example. Rather than responding separately, each node collects any responses from other nodes and provides a response with the concatenated information. For example, intermediary 18 receives the response D from the destination 20. The timestamps and signatures of response D, with or without other information, is combined with the timestamps and signatures of response C. This concatenated response with combined information is received by the intermediary 16. The intermediary 16 concatenates the timestamps and signatures of response B with the response C and response D concatenation. The resulting combination is received by the source 14. Combinations of concatenation and individual responses may be used.

A given initiator may be part of multiple communications routes. Requests may be transmitted and responses received for different traffic flows. Each flow may be separately identified, such as part of the filtering specification. The latency may be determined separately for the different user traffic flows.

In act 88, latency is calculated. The latency is calculated for the identified packets of the data from the user traffic. The received timestamps and signatures are used to determine latency of the user traffic flow.

The initiator or source calculates the latency. A device in the flow path receives the timestamps from the observation nodes of the flow path and determines latency. Other devices may perform the calculation, such as one of the observation nodes or a device not on the user traffic flow path.

The calculated latency is a passive measure. Rather than measuring latency of inserted or synthetic data, such as latency of the mediatrace request and/or responses, the latency of the user traffic itself is measured. The filtering specification of the packets with user payload is used to measure latency for actual user traffic.

The calculations are based on the observation nodes observation of the arrival of identified packets. The timestamp represents the time of the arrival of the packet. The time of transmission is also recorded. For example, the source, acting as a mediatrace initiator, records the time of transmission of the packets. The packet signatures are used to match packets that are transmitted with receipt of the same packet.

The delay from transmission to arrival is calculated. For example, a difference in time between the transmittal timestamp and the arrival timestamp is the latency. The latency of a packet leaving the source device to arrival at the intermediary or destination device is determined.

The latency may be an average or other statistical combination for multiple packets of a user traffic flow. For example, timestamps for transmittal and arrival of multiple of the same type of packet are obtained. The latency for each packet is calculated, and then resulting latencies are averaged for a given time period.

Separate latencies may be calculated for different types of packets. For example, an average latency over 5 seconds for audio is calculated, and the average latency over 5 seconds for video is calculated. In one embodiment, the initiator creates a separate cache for each monitor interval (i.e., time period). For a given cache, the timestamps are sorted by the flow identification (e.g., 5-tuple). For a given flow, the timestamps are sorted by the identifiers, such as a hash and/or checksum. Packets seen only at one observation node, such as due to dropped packets, are discarded. After any sorting by type of packet, the delay or delays for the flow from the source to the node is computed.

The latency is calculated for each hop. By determining the OWD latency from the source to any given node along the flow path, the hop-by-hop latency may be calculated. For an individual hop, the delays or latency from previous hops may be subtracted. Alternatively, each node also timestamps a time of transmittal of the packets to the next node. The difference in time or delay for each hop is determined. In other embodiments, the time of arrival at a node and the time of arrival at a subsequent node are used to calculate the difference, providing a hop latency.

In one embodiment, an OWD from the source to the destination is calculated with or without hop-by-hop latency calculation. The delay from transmittal by the source to receipt by the destination is determined. The latencies for each hop may be summed. Alternatively, the delay from transmittal by the source to receipt by the destination is calculated.

The OWD from the source to the destination and/or hops in-between is measured passively. User traffic, such as audio and/or video traffic, is tracked for calculating latency. The actual travel time of the very data of interest is determined. In additional or alternative embodiments, the latency of other packets is calculated. For example, the latency of the request (e.g., RSVP request of the mediatrace) itself is determined. Timestamps for arrival of the request at each node are provided. This protocol or management packet measurement provides a synthetic measure rather than passive since such packets may be handled differently than user traffic.

The round-trip travel time may be calculated instead of or in addition to one-way delay. In one embodiment, the destination is requested to perform the initiation of another trace and transmit another request. Where user traffic is two directional, the process is performed in both directions. Using the same or different communications route in each direction, the OWD for each direction is calculated. Latency of individual hops and/or total route delay (source to destination and destination to source) is calculated.

In another embodiment, user traffic is uni-directional. The round trip travel time may be determined in one direction from synthetic packets and another direction passively. The destination is requested to transmit a request or requests and the latency of the request through the communications route from the destination to the source is determined. In another approach, the receipt of the responses is timed. Timestamps are provided for transmittal of the responses and receipt of the responses by the various nodes. The latency is determined from those time stamps.

In one embodiment, the round trip travel time not only includes the asymmetric source-to-destination OWD and destination-to-source OWD, but also includes any latency for any server side processing time. Two round trip travel times are calculated. RTT-O is computed by adding source-to-destination OWD and destination-to-source OWD. This two-way latency does not include the server time. The other, RTT-Alt, is computed by measuring the round trip time of an active measurement (e.g., passive, synthetic (ICMP request/response), or passive and synthetic). For example, the one way delay measurement is performed passively for traffic from the source to the destination. The synthetic mediatrace request and response timestamping is used to determine delay in both directions as a round trip travel time. The time from transmittal from any node to receiving a response from the destination includes server time. For example, the time from transmittal from intermediary node 16 of FIG. 1 of a request to receiving a response from intermediary node 18 generated from a response of the destination 20 provides a round trip travel time including the server (i.e., destination) processing. The latency of the source 14 to the intermediary node 16 may be added in both directions, providing two-way delay with server processing. The sum of one-way delays in both directions may be differenced from the round trip travel time. The result indicates server delay. Using the round trip travel time and one-way-delay computations, a comparison can be made to determine if there is non-network delay being added. An increased load on the server may be detected based on multiple samples or measures from different packets.

In act 90, the latency is published. Any format may be used, such as returning the statistics in an RSVP message. The source or initiator in the communications route of the user traffic provides the latency to a requesting device. The initiator device may also verify that the requestor has access to the performance data of network devices based on a credential received from the requestor. If such access is authorized, the initiator device forwards the performance data of the communications route and/or user traffic flow to the requestor. Broadcast or addressed communication of the statistics may be provided. Alternatively or additionally, the latency is stored for access when requested.

Any latency information may be published. The one-way-delay for any hop or combination of hops may be provided. The latency in one or two directions may be provided. A round trip travel time, with or without server side processing delay, may be provided. A server side processing delay may be provided. Variation or deviation from typical or other latency statistic may be provided.

In one embodiment, a mediatrace response message that includes performance statistics, such as the latency, is returned. In addition to drop count, average rate, loss information, confidence, other rates, other counts, and/or other statistics, the round trip travel time, source to destination one-way-delay, and destination to source one-way-delay are provided. These latency metrics may be for a given intermediary node where the one-way-delays and round trip travel time are from the intermediary to the destination and back. The round trip travel time includes or does not include server processing delay.

In one embodiment, the gathering of the latency metrics is protected from packet amplification. Reply-request is issued for every hop as opposed to collecting replies from all hops with just one message. Each node initiates a request to the next node in the communications route to measure latency. The latencies from the various hops may be gathered and published.

Figure 5:
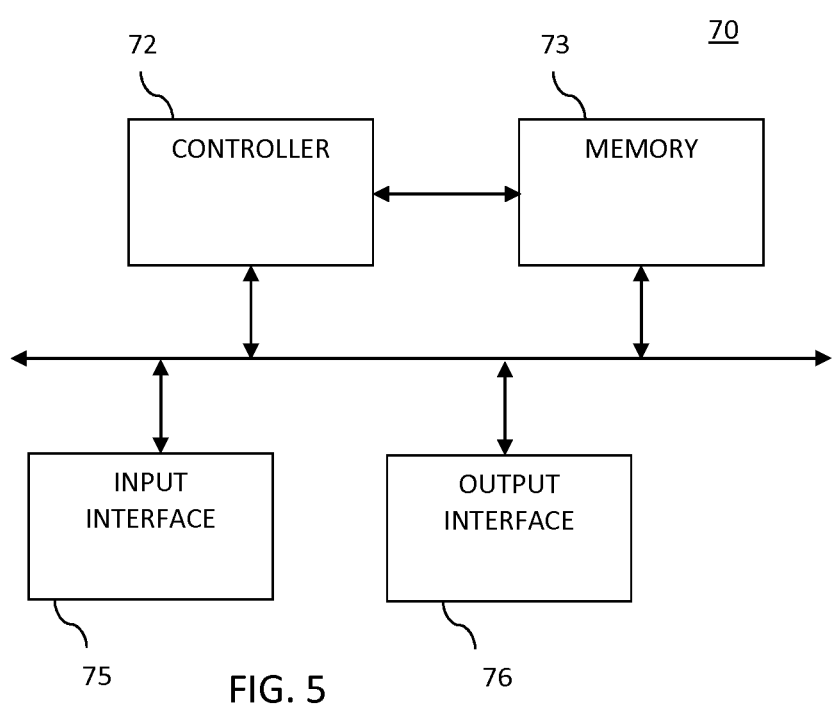
FIG. 5 illustrates an example controller for determining latency in a flow path.

FIG. 5 illustrates an example network device (e.g., source, intermediary, or destination device) 70 configured for calculating latency using one-way-delay with pathing based communications or messaging. The controller 72 may be part of a server, router, switch, firewall, or other network device.

The network device 70 includes at least a controller 72, a memory 73, an input communication interface 75, and an output communication interface 76. Additional, different, or fewer components may be provided, such as a user input device, removable storage media, and/or secondary memory. The different network devices along a communications route in the network or networks may have the same or different arrangement of components.

In addition to ingress ports and egress ports, the input communication interface 75 and the output communication interface 76 may include any operable connection. The interfaces 75, 76 are one device or separate devices. An operable connection may be one in which signals, physical communications, and/or logical communications may be sent and/or received. An operable connection may include a physical interface, an electrical interface, and/or a data interface. In one embodiment, the output communication interface 76 is configured by hardware and/or software to transmit path discovery requests for one-way delay for nodes along a flow path of data. The input communication interface 75 is configured by hardware and/or software to receive responses with timestamps or other information for calculating a performance metric. In other embodiments, the input communication interface 75 receives a request and user packets, and the output communications interface 76 outputs timestamps and packet signatures.

The controller 72 includes logical circuitry or hardware for performing media flow tracing. The input communication interface 75 is configured to receive a request to gather one or more latency metrics for user traffic flow. In response to the request, the controller 72 is configured to gather the metrics, such as using a route discovery process to request timestamps and calculating the latency from the received timestamps.

In one embodiment, the controller 72 is configured by hardware and/or software to act as an initiator of path discovery requests, such as mediatrace, while also acting as a source of user traffic along a communications route. Using data received from observation nodes along the communications route of the user traffic, the controller 72 is configured to gather the timestamps and calculate the latency. The timestamps are gathered from any number of nodes of the communications route. By gathering timestamps for user traffic, passive latency determination is provided. By using path requests or pathing (e.g., mediatrace), the monitoring of the latency for user traffic is path aware. The latency for the specific path of the user traffic is determined.

The controller 72 is configured by hardware and/or software to calculate the latency for one or more, such as each, hop in the flow path from a source to a destination. The latency is calculated for one direction or may also include latency for reverse direction communications from the destination to the source. The controller 72 may be configured to calculate a round trip travel time between the source and the destination.

The controller 72 compiles the performance data of the network devices into a media trace table. The network device 70 may store the media trace table in the memory 73 or exports the information from the output interface 76. The performance statistics in the media trace table may include one or more of transmission rate statistics, jitter statistics, dropped packet statistics, and latency (e.g., one-way-delay and/or round trip travel time). The media trace table may also include topology information that describes the topology of the communications route for the user traffic flow. The media trace table may also include interface information (incoming and outgoing), hostnames, and the quality of service (QOS) values. The quality of service values allow the provider network to prioritize various media flows according the importance of the media. For example, VoIP may be prioritized over video streams. Additional, different, or fewer data may be included in the media trace table.

The performance statistics may be collected on a predetermined interval. The predetermined interval may be user determined by an input entered at workstation. Any interval is possible, and example intervals include 10 seconds and 10 minutes. Alternatively, the performance statistics are collected in response to the request to troubleshoot the media stream.

The provider network may provide the performance statistics according to a subscription to the performance statistics. For example, the provider may sell the customer access to the performance statistics. The customer may prefer to subscribe to the performance statistics to monitor the levels of service received from the service provider. Various subscription levels may entitle the customer access to different portions of the performance statistics.

The controller 72 may include a general processor, digital signal processor, an application specific integrated circuit (ASIC), field programmable gate array (FPGA), analog circuit, digital circuit, combinations thereof, or other now known or later developed processor. The controller 72 may be a single device or combinations of devices, such as associated with a network, distributed processing, or cloud computing.

The memory 73 may be a volatile memory or a non-volatile memory. The memory 73 may include one or more of a read only memory (ROM), random access memory (RAM), a flash memory, an electronic erasable program read only memory (EEPROM), or other type of memory. The memory 73 may be removable from the network device 101, such as a secure digital (SD) memory card.

The processes and devices above may be applied to all types of networks. In one example, the network may be a cellular network. The network devices in the network may include wireless endpoints. A customer device may be a mobile phone receiving a media flow of video across the cellular network. When the video is interrupted, the customer sends a request from the mobile device that initiates performance statistics collection from the towers in the geographic region of the mobile phone.

The customer device may be configured to analyze the performance data and determine the source of the problem. For example, the customer may identify the router in the network that is causing the problem in the media flow. The customer, who previously paid for a certain quality of service but was required to trust the service provider on faith, can audit the service provider. When a problem presents itself, the customer can analyze the performance of the service provider network and inform the service provider of the problem.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
communicating data from a source device to a destination device along a flow path, the data comprising user traffic in packets of media content;
transmitting a request from the source device to an intermediary device of the flow path, wherein the request includes an identification of packets of the data and includes a query for timestamps for the identified packets of the data arrived at the intermediary device from the source device, wherein the request comprises a route discovery request for the flow path, wherein the route discovery request comprises the identification as filter and sampling parameters of the data;
receiving, from the intermediary device and in response to the request, the timestamps for the identified packets of the data arrived at the intermediary device from the source device; and
calculating, by the source device, a latency of the identified packets of the data on the flow path from the source device to the intermediary device using the timestamps.

2. The method of claim 1, wherein communicating data comprises communicating audio, video, or audio and video data, the packets comprising packets of the audio, video, or audio and video data.

3. The method of claim 1, wherein transmitting the route discovery request comprises transmitting a mediatrace request.

4. The method of claim 1, wherein transmitting the request with the timestamp query comprises transmitting the request as a one-way delay request for the packets of the data.

5. The method of claim 1, wherein receiving comprises receiving the timestamps with packet signatures for the identified packets.

6. The method of claim 1, wherein calculating the latency comprises calculating a delay from the packets leaving the source device to arrival at the intermediary device.

7. The method of claim 1, wherein receiving further comprises receiving, in response to the request, other timestamps from other intermediary devices and from the destination device, the other timestamps being for the identified packets of the data received by the other intermediary devices and the destination device, and wherein calculating comprises calculating the latency from the source to the destination.

8. The method of claim 1, wherein communicating the data comprises communicating different types of packets, wherein transmitting the request with the identification comprises transmitting with the identification of the packets of the different types, wherein receiving comprises receiving the timestamps for the different types, and wherein calculating comprises calculating separate latencies for the different types.

9. The method of claim 1, further comprising: receiving, by the source device and from a requestor device outside the flow path, an instruction to initiate the request, and providing the latency to the requestor device.

10. The method of claim 1, wherein transmitting the request comprises transmitting the request with a reverse request for the destination device to gather timestamps for a destination device to source device latency.

11. The method of claim 10, wherein calculating comprises calculating a round trip travel time.

12. The method of claim 11, wherein calculating the round trip travel time comprises calculating the latency from the source device to the intermediary device, from the intermediary device to the source device, and from receipt by the intermediary device of the request to a response from the intermediary device to the source device.

13. An apparatus comprising:
a communication interface configured to enable network communications with a destination device; and
a controller configured to:
communicate data to the destination device along a flow path, the data comprising user traffic in packets of media content;
transmit a request to an intermediary device of the flow path, wherein the request includes an identification of packets of the data and includes a query for timestamps for the identified packets of the data arrived at the intermediary device from the apparatus, wherein the request comprises a route discovery request for the flow path, wherein the route discovery request comprises the identification as filter and sampling parameters of the data;
receive, from the intermediary device and in response to the request, the timestamps for the identified packets of the data arrived at the intermediary device from the apparatus; and
calculate a latency of the identified packets of the data on the flow path from the apparatus to the intermediary device using the timestamps.

14. The apparatus of claim 13, wherein the controller is a controller of a source of the data of the flow path, the source comprising an initiator of the request configured to gather the timestamps and calculate the latency.

15. The apparatus of claim 13, wherein the controller is configured to initiate path discovery requests for one-way delay along the flow path.

16. The apparatus of claim 13, wherein the controller is configured to calculate a latency for each hop in the flow path from a source device to the destination device, a latency for reverse direction communications from the destination device to the source device, and a round trip travel time between the source device and the destination device.

17. A non-transitory computer-readable storage medium encoded with software comprising computer executable instructions which, when executed by a processor of a source device, cause the processor to:
communicate data to a destination device along a flow path, the data comprising user traffic in packets of media content;
transmit a request to an intermediary device of the flow path, wherein the request includes an identification of packets of the data and includes a query for timestamps for the identified packets of the data arrived at the intermediary device from the source device, wherein the request comprises a route discovery request for the flow path, wherein the route discovery request comprises the identification as filter and sampling parameters of the data;
receive, from the intermediary device and in response to the request, the timestamps for the identified packets of the data arrived at the intermediary device from the source device; and
calculate a latency of the identified packets of the data on the flow path from the source device to the intermediary device using the timestamps.

18. The non-transitory computer-readable storage medium of claim 17, wherein the computer executable instructions further cause the processor to:
receive the timestamps with packet signatures for the identified packets.

19. The non-transitory computer-readable storage medium of claim 17, wherein the computer executable instructions further cause the processor to:
transmit a mediatrace request when transmitting the route discovery request.

20. The non-transitory computer-readable storage medium of claim 17, wherein the computer executable instructions further cause the processor to:
calculate a delay from the packets leaving the source device to arrival at the intermediary device.

* * * * *